United States Patent [19]

Carter, Jr.

[11] Patent Number: 4,510,196
[45] Date of Patent: Apr. 9, 1985

[54] POLYCARBONATE COMPOSITIONS CONTAINING POWDERED SULFATES

[75] Inventor: Russell P. Carter, Jr., New Martinsville, W. Va.

[73] Assignee: Mobay Chemical Corporation, Pittsburgh, Pa.

[21] Appl. No.: 423,928

[22] Filed: Sep. 20, 1982

[51] Int. Cl.$^3$ .......................... C08K 3/30; C08L 69/00
[52] U.S. Cl. .................................. 428/220; 523/200; 523/375; 524/322; 524/423; 524/611
[58] Field of Search ............... 524/423, 611; 523/200, 523/375

[56] References Cited

U.S. PATENT DOCUMENTS

| | | | |
|---|---|---|---|
| 3,424,703 | 1/1969 | Jones | 260/18 |
| 3,803,065 | 4/1974 | Arai et al. | 524/423 |
| 3,809,671 | 5/1974 | Okawa et al. | 524/423 |

FOREIGN PATENT DOCUMENTS

| | | | |
|---|---|---|---|
| 0066772 | 12/1982 | European Pat. Off. | 524/611 |
| 1544920 | 7/1969 | Fed. Rep. of Germany . | |
| 2251708 | 4/1974 | Fed. Rep. of Germany | 524/423 |
| 2608023 | 9/1977 | Fed. Rep. of Germany | 524/423 |
| 1162227 | 8/1969 | United Kingdom . | |
| 1237164 | 6/1971 | United Kingdom . | |
| 525726 | 12/1974 | U.S.S.R. | 524/423 |

OTHER PUBLICATIONS

Polycarbonates—William S. Christopher and Daniel W. Fox, Reinhold Publishing Corporation, New York, 1962, pp. 83–87.
Modern Plastics Encyclopedia, 1980–1981, vol. 57, No. 10A, pp. 180–182.
Merlon Polycarbonate, A General Reference Manual, Mobay Chemical Corporation, p. 4.
Ken-React Reference Manual, Kenrich Petrochemicals, Inc., Bulletin No. KR–0278-7, Rev. #2, p. 24 et seq.
Silane Coupling Agents in Mineral Filled Compositions, Union Carbide Corporation, p. 25.
Slip and Antiblock Agents-A Guide to Their Use, H. W. Mock et al., Plastics & Technology-Aug., 1974-pp. 41/43.
Slip and Antiblock Agents–Attaining that Delicate Balance, A. M. Birks-Plastics Technology, Jul., 1977-pp. 131–139.

*Primary Examiner*—C. Warren Ivy
*Attorney, Agent, or Firm*—Gene Harsh; Lawrence S. Pope; Aron Preis

[57] ABSTRACT

Polycarbonate compositions comprising an aromatic polycarbonate resin wherein dispersed are powdered sulfates, are particularly suitable for the preparation of films characterized by their low coefficient of static friction, high light transmission and virtual freedom from haze.

14 Claims, No Drawings

POLYCARBONATE COMPOSITIONS CONTAINING POWDERED SULFATES

FIELD OF THE INVENTION

The present invention is directed to polycarbonate compositions and, more particularly, to blends comprising aromatic polycarbonate resins and powdered sulfates.

BRIEF DESCRIPTION OF THE INVENTION

A polycarbonate composition comprising an aromatic thermoplastic polycarbonate resin, wherein dispersed are powdered sulfates, was found to be especially suitable for the preparation of films characterized by their low coefficient of static friction, high light transmission and virtual freedom from haze.

DESCRIPTION OF THE PRIOR ART

Polycarbonates derived from reactions involving organic dihydroxy compounds and carbonic acid derivatives have found extensive commercial application because of their excellent mechanical and physical properties. These thermoplastic polymers are particularly suited for the manufacture of molded articles for which impact strength, rigidity, toughness, thermal and dimensional stability as well as excellent electrical properties are required. Furthermore, polycarbonates are eminently suited for casting or extrusion into films which are characteristically of high clarity, color and oxidative stability as well as flame resistant.

One deficiency of polycarbonate-based films has been the high static coefficient of friction, a factor effecting their handling and somewhat restricting their usefulness. It has been the experience of those skilled in the art that the surfaces of films tend to stick when they are made to slide over similar surfaces, a tendency sometimes referred to as "blockiness", due largely to their high static coefficient of friction.

In this connection, see "Slip and Antiblock Agents—A Guide to Their Use", by H. W. Mock et al, Plastics Technology, August, 1974, page 41; "Slip and Antiblocking Agents—Attaining that Delicate Balance", by A. M. Birks, Plastics Technology, July, 1977, page 131; and "Does the slip of your web help or hurt its performance?" by R. L. Mueller, Package Engineering, April, 1973, page 61.

Attempts to lower that friction by chemical modifiers are not entirely satisfactory in that such modifications adversely affect other desirable properties of the films. U.S. Pat. No. 3,424,703 teaches lowering the coefficient of friction of polycarbonate films by adding small amounts of either silica or talc. One notable disadvantage entailed in the use of silica relates to the limit of about 1 phr that may be incorporated in polycarbonates before processing difficulties are encountered.

The art is noted to disclose the utility of clay, starch and glass particulates and calcite as antiblocking agents for polycarbonates, see Ser. No. 270,708 filed June 5, 1981; U.S. Pat. No. 4,405,731; Ser. No. 345,887 filed Feb. 4, 1982, abandoned and Ser. No. 358,391 filed Mar. 15, 1982 now U.S. Pat. No. 4,454,261, respectively.

It is thus an object of the present invention to provide a polycarbonate composition of improved processability suitable for the preparation of films of low static coefficient of friction. It is a further object to provide a polycarbonate concentrate composition comprising up to about 5 phr of powdered sulfate.

DETAILED DESCRIPTION OF THE INVENTION

The polycarbonate resins useful in the practice of the invention are homopolycarbonates, copolycarbonates and terpolycarbonates or mixtures thereof. The polycarbonates generally have molecular weights of 10,000–200,000 (weight average molecular weight) preferably 20,000–80,000, and are additionally characterized by their melt flow of 1–24 gm/10 min. at 300° C. per ASTM D-1238. These polycarbonates may be prepared, for example, by the known diphasic interface process from phosgene and bisphenols by polycondensation (see German OS Nos. 2,063,050; 2,053,052; 1,570,703; 2,211,956; 2,211,957 and 2,248,817 and French Pat. No. 1,561,518 and the monograph, H. Schnell, *Chemistry and Physics of Polycarbonates,* Interscience Publishers, New York, 1964, all incorporated herein by reference).

In the present context, bisphenols suitable for the preparation of the polycarbonates of the invention conform to the structural formulae (1) or (2)

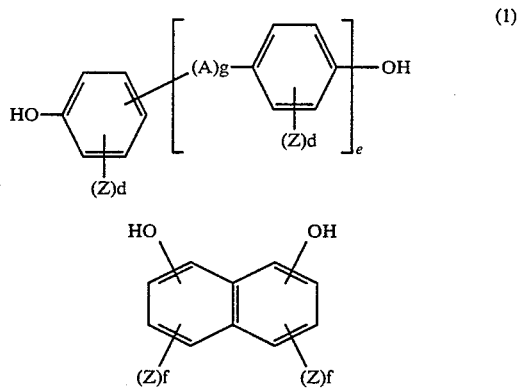

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or —SO$_2$— radical; a radical of the general formula

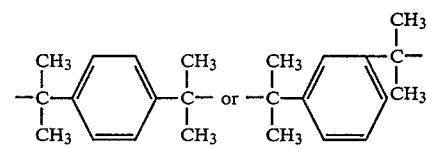

g denotes the number 0 or 1;
e denotes the number 0 or 1;
Z denotes F, Cl, Br or a C$_1$–C$_2$ alkyl and if several Z radicals are substituents in one aryl radical, they may be identical or different;
d denotes 0 or an integer of from 1 to 4; and
f denotes 0 or an integer of from 1 to 3.

Among the useful bisphenols in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)- sulfones and α,α-bis-(hydroxyphenyl)-diisopropyl-benzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,418 and in the monograph, H. Schnell, *Chemistry and Physics of Polycarbonates*, Interscience Publishers, New York, 1964. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenol.

The most preferred bisphenol is 2,2-bis-(4-hydroxyphenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Pat. Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention monofunctional reactants such as monophenols may be used in order to limit their respective molecular weights. Also, branching agents may be employed. Branching may be obtained by the incorporation of small amounts, preferably of between about 0.05 and 2.0 mol% (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, 2,6-bis-(2-hydroxyl-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra (4-(4-hydroxyphenylisopropyl)-phenoxy)-methane and 1,4-bis-(4',4''-dihydroxy-triphenyl)-methyl) benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole.

Among the resins suitable in the practice of the invention are included phenolphthalic-based polycarbonate, copolycarbonates and terpolycarbonates such as are described in U.S. Pat. Nos. 3,036,036 and 4,210,741, both incorporated by reference herein.

SULFATE POWDERS

In the present context sulfate powders are selected from among the sulfates of Ca, Sr, Ba and Ra, preferably calcium sulfate and barium sulfate and may be used in their anhydrous or hydrous form and may further be surface treated such as by the application of a coupling agent, to improve their compatibility with the polycarbonate matrix.

Regardless of its source, the sulfate powder useful in the present context is characterized in terms of its average particle size. The sulfate suitable in the practice of the invention may have an average particle size between about 0.5 and about 15 microns, preferably between about 0.5 to about 13 microns.

To the extent that the sulfate powders once admixed with the polycarbonate may, under suitable conditions, tend to react with the resin, care should be taken to coat the particulates with any of suitable agents (for instance, stearic acid) to prevent or at least greatly slow down that reaction.

Among the calcium sulfate suitable in the present context are the products available from U.S. Gypsum such as under the trade names of Snow White (an anhydrous calcium sulfate characterized by its average particle size of about 7 microns); Terra Alba #1 (a hydrous calcium sulfate—average particle size of about 12.2 microns), Terra Alba F & P grade (anhydrous calcium sulfate of 12.2 microns in average particle size) and CA-5 which is an ultra-fine anhydrous calcium sulfate (1.4 microns in average particle size). Among the barium sulfates suitable in the present invention are barytes such as water floated pigment grades available commercially from Whittaker, Clark & Daniels Inc. These are characterized in that their average particle size is about 4.5–5.5 microns. Typically, the particle size distribution of pigment grades of barytes suitable in accordance with the practice of the invention is:

100% smaller than 44 microns
98% smaller than 30 microns
95% smaller than 20 microns
80% smaller than 15 microns
60% smaller than 10 microns
32% smaller than 5 microns
25% smaller than 4 microns
10% smaller than 1 micron The compositions of the invention may incorporate from about 0.025 to about 5 phr of powdered sulfates and be thus particularly suitable as concentrates to be diluted by admixing with polycarbonate resin to a predetermined loading.

As used throughout the disclosure, the term phr refers to parts by weight per 100 parts by weight of resin.

Further, the polycarbonate compositions of the invention may incorporate 0.025 phr to about 1.0 phr, preferably 0.025 to about 0.1 phr, of powdered sulfates and be thus particularly suitable for the preparation of films which are characterized by their low static coefficient of friction. In any case, care should be taken to minimize the amount of moisture in both the resin and the sulfate. The amount of moisture should not, in any case, be in excess of 2.0%, preferably 0.5%.

Although the results tabulated below wherein summarized are test results demonstrative of the inventive concept, are believed clear, the following notes are offered by way of further elucidation:

The results reported in the tables were obtained upon testing of the solution cast films and as is well known in the art, these results are indicative of trends to be expected upon the evaluation of extruded films. It should further be noted that the values of the coefficient of friction thus obtained are significantly higher than the values obtained upon testing the corresponding extruded films. Accordingly, $\mu s$ and $\mu k$ are, respectively, the static and kinetic coefficients of friction as measured per ASTM D 1894-78. The symbols O-O, O-I and I-I are significant in identifying the surface of the sample tested. The films whose properties are reported below were all cast from solution onto glass and the "air side" of the film is designated as O while the glass side is designated I. The "torture test" is conducted on a 3 ounce injection molding machine at a temperature of 725° F. and molding cycles of one minute and is designed to test the thermal stability of a resinous composition. A skilled operator may determine by evaluating the parts molded under the processing parameters above, whether the composition suffers thermal degradation, for instance, upon the incorporation of additives thereto. A subjective evaluation indicative of the sufficiency of thermal stability is reported in the table below.

Measurements of melt flow were carried out as an added criteria indicating structural or chemical changes that may occur upon the incorporation of the powdered sulfate additive. An abnormal change in flow, which may indicate depolymerization or cross-linking, may point to processing difficulties which can be expected upon the extruding of the compound into films.

The polycarbonate compositions of the invention are prepared by blending a polycarbonate resin with a predetermined amount of suitable sulfate powder to provide a homogeneous dispersion thereof in the resin. Such blending may be carried out in any of suitable blenders or mixers commonly used in the art. The preparation of films by the solution casting method, extrusion and by blow molding techniques are described in the monograph, *Chemistry and Physics of Polycarbonates,* H. Schnell, Interscience Publishers, 1964, and in *Polycarbonates* by Christopher and Fox, Reinhold Publishing Corporation, 1962, both incorporated by reference herein. The compositions of the instant invention are suitable for the preparation of thin films (less than 10 mils) of excellent clarity and low static coefficient of friction.

The polycarbonate resin used in the course of the experiments described in Table 1 is HMS 3119, a branched polycarbonate resin of 1.29–1.30 relative viscosity (measured on 0.5% solution in methylene chloride) and having a melt flow rate of 1.5–2.5 g/10 min. per ASTM D-1238 and is a product of Mobay Chemical Corporation. The static coefficient of friction (O-O) of HMS 3119 is about 10.0. The haze and light transmission values of HMS 3119 are 0.4% and 91.9%, respectively. The thickness of the films which properties are tabulated below was 1 mil.

TABLE 1

| Example | Control | 1 | 2 | 3 | 4 | 5 | 6 | 7 | 8 | 9 |
|---|---|---|---|---|---|---|---|---|---|---|
| Amount of added modifier phr | none | 1.0 | 0.5 | 0.1 | 1.0 | 0.5 | 0.1 | 1.0 | 0.5 | 0.1 |
| Type of modifier[1] | none | A | A | A | B | B | B | C | C | C |
| Melt Flow gm/10 min. | 2.3 | 2.5 | 2.5 | 3.0 | 2.8 | 2.3 | 2.3 | 2.6 | 2.3 | 2.4 |
| Light transmission[3]% | 91.8 | 91.6 | 91.6 | 91.6 | 91.8 | 91.8 | 91.9 | 91.9 | 91.9 | 91.9 |
| Haze[3] | 0.6 | 0.6 | 0.5 | 0.7 | 0.7 | 0.9 | 0.4 | 1.0 | 0.9 | 0.5 |
| Torture test[4] | — | — | — | — | — | — | — | G | G | Ex |
| Coefficient of friction | | | | | | | | | | |
| O—O $\mu s$ | 10.46 | 1.06 | 2.70 | 1.80 | 5.12 | 10.35 | 10.35 | .965 | 1.56 | 7.83 |
| $\mu k$ | .406 | .761 | .736 | .558 | 1.22 | 1.22 | — | .599 | .838 | .964 |
| O—I $\mu s$ | .685 | .751 | 3.31 | 2.04 | 1.80 | 2.82 | 7.31 | .944 | 4.28 | 4.45 |
| $\mu k$ | .366 | .812 | .660 | .533 | .914 | 1.22 | .888 | .685 | .812 | .914 |
| I—I $\mu s$ | .431 | .873 | .746 | .508 | .863 | .914 | 2.54 | 1.14 | 1.17 | 1.04 |
| $\mu k$ | .482 | .787 | .863 | .761 | .812 | .761 | 1.73 | 1.37 | .888 | 1.12 |

[1]The resin used in these was MERLON M-40 having a melt flow of G-11.8 gm/10 min. available from Mobay Chemical Corporation.
[2]Modifier A is an anhydrous-calcium sulfate having an average particle size of about 7 micron; B is Terra Alba #1; C is Terra Alba #F & B grade; D is CA-5; and E is barium sulfate.
[3]Per ASTM D-1003-61
[4]See text above

TABLE 2

| Example | Control | 10 | 11 | 12 | 13 | 14 | 15 | 16[1] | 17[1] | 18[1] |
|---|---|---|---|---|---|---|---|---|---|---|
| Amount of added modifier, phr | none | 1.0 | 0.5 | 0.1 | 1.0 | 0.5 | 0.1 | 1.0 | 0.5 | 0.1 |
| Type of modifier[1] | none | D | D | D | E | E | E | D | D | D |
| Melt flow gm/10 min. | 2.3 | 2.4 | 3.5 | 2.3 | 2.2 | 2.2 | 2.2 | 9.4 | 9.7 | 9.4 |
| Light transmission[3]% | 91.8 | 91.4 | 91.5 | 91.5 | 91.8 | 91.9 | 91.9 | — | — | — |
| Haze[3]% | 0.6 | 1.4 | 1.3 | 1.1 | 1.7 | 1.1 | 0.4 | — | — | — |
| Torture test[4] | — | — | — | — | — | — | — | — | — | — |
| Coefficient of friction | | | | | | | | | | |
| O—O $\mu s$ | 10.46 | .761 | 1.73 | 9.57 | .848 | 4.04 | 10.36 | .706 | 4.84 | 7.59 |
| $\mu k$ | .406 | .777 | .812 | .685 | 1.041 | .939 | — | .508 | .655 | .609 |
| O—I $\mu s$ | .685 | .939 | 5.10 | 4.33 | 1.218 | 5.228 | 6.29 | .487 | .817 | 4.20 |
| $\mu k$ | .366 | .761 | .736 | 1.117 | .787 | 1.066 | 1.218 | .457 | .660 | .558 |
| I—I $\mu s$ | .431 | .965 | .939 | 1.24 | .949 | 5.228 | 2.132 | .432 | .487 | .558 |

TABLE 2-continued

| Example | Control | 10 | 11 | 12 | 13 | 14 | 15 | 16[1] | 17[1] | 18[1] |
|---|---|---|---|---|---|---|---|---|---|---|
| μk | .482 | 1.68 | 1.32 | 1.01 | .965 | 1.117 | 3.248 | .421 | .609 | .685 |

[1]The resin used in these was MERLON M-40 having a melt flow of G-11.8 gm/10 min. available from Mobay Chemical Corporation.
[2]Modifier A is an anhydrous-calcium sulfate having an average particle size of about 7 micron; B is Terra Alba #1; C is Terra Alba #F & P grade; D is CA-5; and E is barium sulfate.
[3]Per ASTM D-1003-61
[4]See text above

What is claimed is:

1. A clear film having a thickness of less than 10 mils comprising
    (i) an aromatic thermoplastic polycarbonate resin, and
    (ii) between 0.025 to about 1.0 phr of sulfate powder having an average particle size of about 0.5 to about 15 microns said film being characterized in that its moisture content is not in excess of 2% relative to its weight and in that its light transmission measured in accordance with ASTM D-1003-61 is not less than 91.4%.

2. The film of claim 1, wherein said sulfate powder is selected from the group consisting of calcium sulfate and barium sulfate.

3. The film of claim 1 or 2, wherein said particle size is about 0.5 to about 13 microns.

4. The film of claim 1, wherein said sulfate powder is treated with a coupling agent.

5. The film of claim 1 or 4, wherein said (i) is a bisphenol-based polycarbonate.

6. In the process for the preparation of clear films having a thickness of less than 10 mils, the improvement comprising using a polycarbonate composition comprising
    (i) an aromatic thermoplastic polycarbonate resin, and
    (ii) between 0.025 to 1 phr of sulfate powder having an average particle size of about 0.5 to about 15 microns said polycarbonate composition being characterized in that its moisture content is not in excess of 2% relative to its weight.

7. The improvement of claim 6, wherein said process is solution casting.

8. The improvement of claim 6, wherein said process is extrusion.

9. The improvement of claim 6, wherein said process is blow molding.

10. The improvement of claim 6 or 7 or 8 or 9 wherein said sulfate powder is selected from the group consisting of calcium sulfate and barium sulfate.

11. The improvement of claim 6 or 7 or 8 or 9 wherein said sulfate powder is treated with a coupling agent.

12. The film of claim 1, wherein said sulfate powder is selected from the group consisting of calcium sulfate, barium sulfate, strontium sulfate and radium sulfate.

13. The film of claim 1 having thicknesses of about 10 mils or less.

14. A clear film having a thickness of less than 10 mils comprising
    (i) an aromatic thermoplastic polycarbonate resin, and
    (ii) between 0.25 to about 1.0 phr of sulfate powder having an average particle size of about 0.5 to about 15 microns said film being characterized in that its moisture content is not in excess of 2% relative to its weight and in that its haze as measured in accordance with ASTM D-1003-61 is not more than 1.7%.

* * * * *